United States Patent
Heimberg

(12)
(10) Patent No.: US 6,715,464 B2
(45) Date of Patent: *Apr. 6, 2004

(54) FUEL INJECTION DEVICE FOR INTERNAL COMBUSTION ENGINES

(75) Inventor: Wolfgang Heimberg, Ebersberg (DE)

(73) Assignee: Bombardier Motor Corporation of America, Grant, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,975

(22) PCT Filed: Apr. 23, 1996

(86) PCT No.: PCT/EP96/01695

§ 371 (c)(1),
(2), (4) Date: Jun. 3, 1998

(87) PCT Pub. No.: WO96/34195

PCT Pub. Date: Oct. 31, 1996

(65) Prior Publication Data

US 2002/0011239 A1 Jan. 31, 2002

(30) Foreign Application Priority Data

Apr. 28, 1995 (DE) .......................... 195 15 781
Apr. 28, 1995 (DE) .......................... 195 15 774

(51) Int. Cl.⁷ ................................................ F02B 3/00

(52) U.S. Cl. ...................................... 123/300; 123/495

(58) Field of Search ......................... 123/446, 495, 123/300, 299, 447, 456; 417/417, 499, 490

(56) References Cited

U.S. PATENT DOCUMENTS

| | | | | | |
|---|---|---|---|---|---|
| 2,833,220 | A | * | 5/1958 | Robinson | 417/418 |
| 3,282,219 | A | * | 11/1966 | Blackwell | 417/418 |
| 4,210,116 | A | * | 7/1980 | Brinkman | 123/497 |
| 4,309,153 | A | * | 1/1982 | Panick | 417/418 |
| 4,520,774 | A | * | 6/1985 | Sitter | 123/300 |
| 4,590,903 | A | * | 5/1986 | Hofmann et al. | 123/300 |
| 4,590,904 | A | * | 5/1986 | Wannenwetsch | 123/300 |
| 4,964,389 | A | * | 10/1990 | Eckert | 123/447 |
| 5,252,043 | A | * | 10/1993 | Bolding | 47/418 |
| 5,469,828 | A | * | 11/1995 | Heimberg | 123/497 |
| 5,662,461 | A | * | 9/1997 | Ono | 417/417 |
| 5,779,454 | A | * | 7/1998 | Binversie | 417/417 |

FOREIGN PATENT DOCUMENTS

| | | | | | |
|---|---|---|---|---|---|
| AU | 7764/32 | * | 6/1932 | | 417/418 |
| AU | 86558/91 | * | 9/1992 | | 123/497 |
| DE | 411313 | * | 6/1934 | | 417/418 |

* cited by examiner

*Primary Examiner*—Carl S. Miller
(74) *Attorney, Agent, or Firm*—Ziolkowski Patent Solutions Group, LLC

(57) ABSTRACT

A fuel injection device operating on the solid-state energy storage principle and configured as a reciprocating plunger pump having a delivery plunger element, the delivery plunger element being moved from its starting position in the direction of a pressure chamber, the delivery plunger element storing kinetic energy during a near zero-resistance acceleration phase, this kinetic energy being abruptly transmitted by a impulse movement to the fuel present in the pressure chamber so that a pressure impulse is generated for ejaculating fuel through an injector means, a second pressure chamber being arranged on the side of the delivery plunger element opposite the first pressure chamber such that kinetic energy absorbed on return movement of the delivery plunger element to its starting position is transmitted to fuel present in the second pressure chamber.

28 Claims, 6 Drawing Sheets

FUEL INJECTION DEVICE FOR INTERNAL COMBUSTION ENGINES

The invention relates to a fuel injection device operating on the solid-state energy storage principle, more particularly for two-stroke engines, in accordance with the preamble of claim 1.

Fuel injection devices of this kind are described in EP 0 629 265, by reference to FIGS. 13 to 19 thereof. They operate according to the so-called pump-injector (unit injector) system with impulse injection, wherein an initially accelerated partial stroke of an armature of a solenoid-operated injection pump is provided axially guided at one end, acting as a delivery plunger, in which a displacement of the delivered fuel occurs in the pump system without pressure being built up in the fuel fluid. During this initial partial stroke the delivery plunger or the armature absorbs kinetic energy and stores it, a predetermined flow space being available for the fuel displaced thereby, this flow space being assured by a fuel circuit in the pump system. Due to the fuel circuit being suddenly interrupted predeterminedly by a valve means arranged in the armature or delivery plunger and actuated by the armature movement during the zero-resistance advance stroke of the delivery plunger and due to the subsequent movement of the delivery plunger the latter releases its stored kinetic energy as a impulse in pressure to the partial amount of fuel present in a space portion of the circuit space formed by the circuit interruption or closed off separately—the so-called pressure space— between the delivery plunger or therein and an injector closed e.g. spring-loaded. This abrupt pressure increase in the fuel to e.g. 60 bar results in the injector opening and fuel injected through the injector into a combustion chamber of an internal combustion engine during a extremely short time of e.g. a thousandth of a second.

These pump-injector systems known from EP 0 629 265 comprise a solenoid-operated reciprocating plunger pump 1 and the injector 2 (FIG. 1*a*). These pump-injector systems have a proven record of success particularly in two-stroke engines which formerly were notorious for heavy exhaust emissions due to so-called losses and high fuel consumption due to a high proportion of fuel being able to pass the discharge passage 3 unconsumed, because on two-stroke engines spill and discharge passage 3 are opened simultaneously. By means of the aforementioned pump-injector system the fuel consumption and exhaust emissions have now been drastically reduced. On top of this the poor smooth-running of the engine stemming from irregular ignition at low speeds has been almost completely eliminated. In this arrangement the fuel is injected extremely fast and directly into the combustion chamber 4 of a cylinder 5, i.e. not before the discharge passage 3 has been practically full closed. The control 6 for optimizing the pump-injector system is done electronically via e.g. a microprocessor which controls the injection timing and the amount of fuel injected, for this purpose the injection timing being established e.g. by means of a temperature sensor 7, a butterfly valve potentiometer 8 and a crank angle sensor 9. Expediently, the microprocessor also controls the ignition system 10 of the piston/cylinder unit of the engine charged with fuel by the pump-injector system.

Due to these pump-injector systems the hydrocarbon exhaust emissions as compared to those of other two-stroke engines are drastically reduced whilst simultaneously significantly improving smooth-running, especially at low speeds. Carbon monoxide and oil supplied for lubrication are also emitted in significantly reduced quantities so that such a two-stroke engine is comparable to a four-stroke engine as regards its exhaust emission performance whilst still exhibiting the high power-to-weight ratio typical of the two-stroke type.

In the aforementioned pump-injector systems the fuel circuit space is formed by a pressure chamber and a delivery plunger or armature space, the pressure chamber being the partial space portion separated from the pressure space by a standing pressure valve, the kinetic energy of the armature being transmitted to the fuel in this partial space portion and whereby the armature space is the partial space portion into which the fuel is able to flow displaced with zero resistance during the accelerated partial stroke.

In accordance with known pump-injector systems the armature space may be in connection with a fuel flood/scavenging means via a drilling in the housing so that fuel can be delivered through this partial space portion during the injection activity of the armature and/or during the starting phase of the pump or engine. Due to this flooding or scavenging action with e.g. cooled or bubble-free fuel the armature space is freed of fuel containing bubbles and it as well as its surroundings cooled whilst the formation of bubbles due to heat development and/or cavitation is practically eliminated.

In special instances, especially when the fuel is affected by heat, as may happen in the pump-injector system during operation, e.g. due to the electrical energy and/or armature friction or the like, bubbles may gain access to the pressure space. This may detriment functioning of the pump-injector system and, more particularly, injection.

In direct fuel injection as practised on Diesel engines it is known to configure injection so that initially a first amount of fuel is injected and on completion of ignition delay a second main amount of fuel is injected so that knocking of the Diesel engine is substantially reduced.

In this context two basic approaches are known, namely phased injection and dual injection. Dual injection can be achieved with two pump elements or with a very fast operating single pump element for injection twice. However, the complicated design necessary for this purpose has hitherto thwarted any practical application thereof, all the more so since it was assumed that thus would merely reduce engine knock but not reduce fuel consumption.

It is for this reason that phased injection became popular which is achieved by means of a pre-injection valve having two nozzle passages which open at differing pressures, as a result of which injection is divided into a prejet and a main jet.

It is known furthermore to implement by means of a dual injection a so-called charge stratification of the fuel in the combustion chamber of the engine.

In charge stratification of a spark ignition engine fuel is introduced into a combustion chamber of the engine such that a main amount of fuel forms a lean fuel/air mixture (e.g. l=1.5 to 3.0) and a rich fuel/air mixture (e.g. l=0.85 to 1.3) is enriched in the region of a spark plug. This rich fuel/air mixture is ignited by the spark plug, the lean fuel/air mixture non-ignitable as such then also being combustioned with a large excess of air. Due to this excess air highly favorable exhaust emission performance is achieved.

In the German engine trade journal MTZ Motortechnische Zeitschrift, year 35, Issue No. 10, October 1974, pages 307 to 313 two possibilities of generating charge stratification are cited. One approach to designing a charge stratification engine consists of directly injecting the fuel into a non-compartmented combustion chamber in which the stratification is produced by an oriented swirl of air, as a result of which the mixture in the vicinity of the spark plug is enriched, it remaining nevertheless ignitable even though as a whole it is very lean.

It is the pressure and direction with which the fuel is injected, the positioning of the spark plug relative to an injector and especially the air flow velocity which decisively influence proper functioning of this system. Since the intensity of the air swirl is proportional to the engine speed, difficulties arise in operating in the high speed/load regime as is typical and necessary in automotive engines.

Charge stratification may be achieved by a compartmented combustion chamber, i.e. with the aid of of an ancillary chamber. In this case a lean mixture is induced into one cylinder whilst enrichment takes place in the ancillary chamber by means of an injector or an additional intake system. Systems of this kind are basically independent of changes in speed and load and are thus well suited for automotive engines.

One such charge stratification engine having ancillary chambers is also described in the German engine trade journal MTZ Motortechnische Zeitschrift, year 34, Issue No. 4, April 1973, pages 130, 131. This charge stratification engine is Honda½s so-called CVCC engine incoporated in a compact car and achieving minimum CO, CH and NOx exhaust emissions. The drawback with this engine is that due to the ancillary chambers the efficiency is reduced and fuel consumption increased by approximately 10% as compared to conventional spark ignition engines having no ancillary chambers.

The invention is based on the object of providing a simple fuel injection device achieving reduced exhaust emissions, saving fuel and which is independent of mixture tolerances.

This object is achieved by a multiple injection device having the features of claim 1. The fuel injection device in accordance with the invention operates on the solid-state energy storage principle, as a result of which large amounts of fuel can be injected during short time intervals, and is configured double-acting, the fuel injection device in accordance with the invention exploiting a reciprocating or impulse and recoil movement of delivery plunger element during a working stroke both for initial injection by the impulse movement as well as for a subsequent injection by the recoil movement. Due to this arrangement the configuration of the fuel injection device is substantially simplified as compared to that of two separate injection devices, more particularly the number of parts required is reduced especially when the delivery plunger element is configured integrally.

With the fuel injection device in accordance with the invention precise and fast dual injection is achieved by simple ways and means so that in the combustion chamber an optimum fuel distribution and reliable ignition or combustion are achieved, as a result of which exhaust emissions are reduced and fuel saved. On top of this the engine can be operated with differing mixture qualities as regards the combustion air ratio (l) without ignition and combustion quality being detrimented by differing air quantities which are unavoidable in the cylinder in operation of the engine.

Advantageous aspects of the invention are characterized in the sub-claims.

Accordingly, the invention includes, more particularly, a pressure chamber in which the energy stored in the armature or in the delivery plunger element is transmitted to the fuel, in which the valve interrupting the zero-resistance displacement is configured outside of the armature space or arranged separate from the armature space and armature portion. Due to this arrangement the heat generated in the armature space is not directly transmitted to the pressure chamber, as a result of which heating of the fuel compressed during injection and thus the risk of bubbles forming is considerably reduced. On top of this the pressure chamber is freely accessible so that for further cooling it can be provided, for example, with cooling fins and/or directly with a fuel supply conduit to enable cool fuel free of bubbles to be supplied to the pressure chamber. Furthermore, the pressure chamber can be configured compact so that less fuel is present in the pressure chamber thus reducing the risk of bubbles forming.

In addition, due to the the pressure chamber being small and the fuel supply direct only minor amounts of fuel need to be scavenged.

Double or two-sided axial guidance of the armature in accordance with claim 5 avoids tilting movements of the armature causing friction so that heat development can be suppressed.

The formation of gas bubbles and their effect detrimental to proper functioning and/or heating up of the fuel are practically eliminated.

The fuel injection device in accordance with the invention can be put to use to particular advantage in the case of charge stratification. Since it works on the solid-state energy storage principle high ejaculation pressures can be generated over injection intervals which are extremely short in time, making fast repeat actuation possible at extremely high speeds (exceeding 10,000 rpm) for metering the fuel as a function of load with high accuracy.

The invention will now be dscribed in more detail with reference to the drawing in which.

The fuel injection device in accordance with the invention for internal combustion engines is configured as a solenoid-operated, double-acting reciprocating plunger pump 1 working according to the stored energy principle so that fuel is injected into the internal combustion engine by pressure ejaculation.

Figure 2:
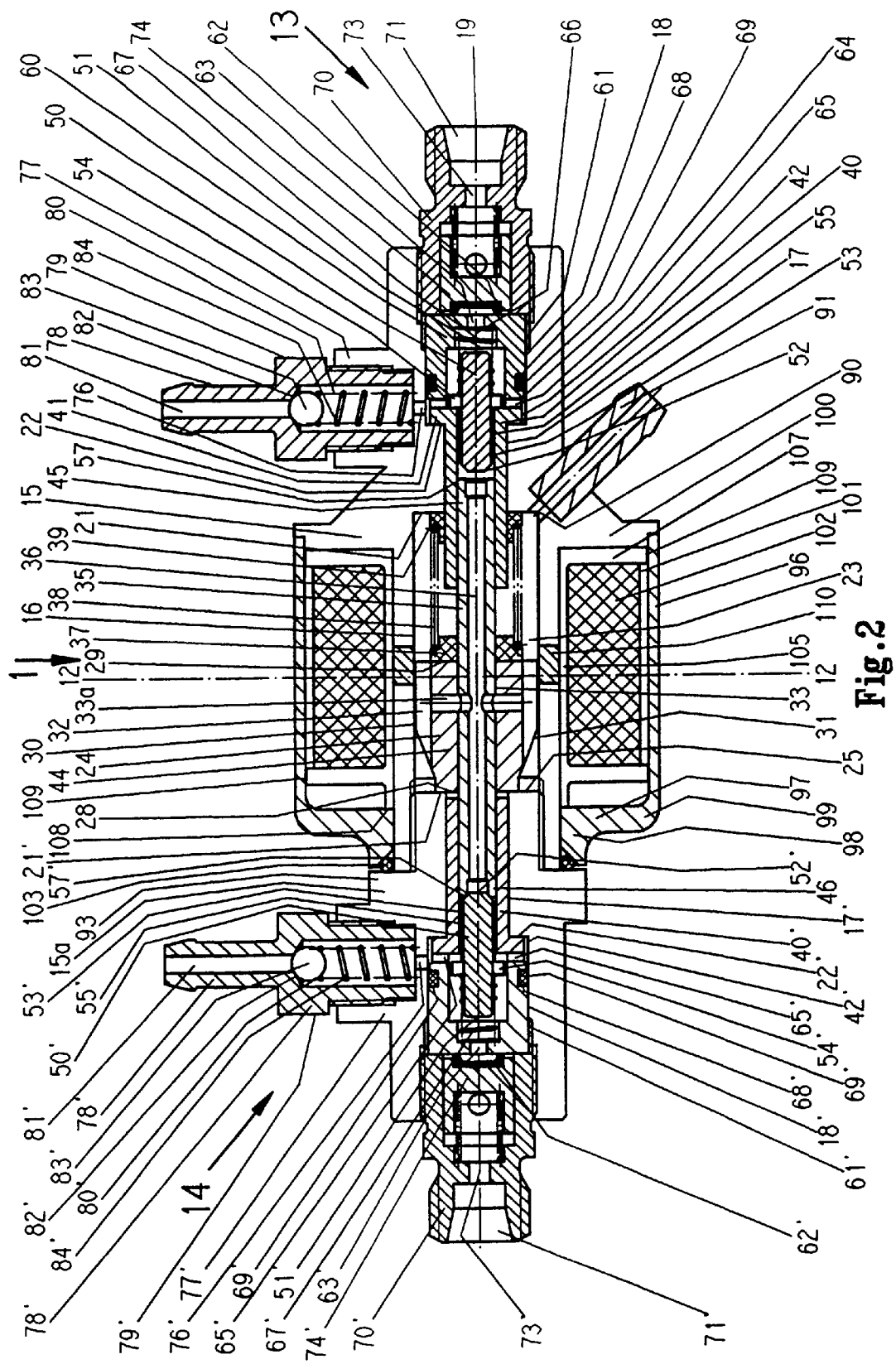
FIG. 2 is a schematic longitudinal section through a first example embodiment of an injection pump in accordance with the invention.
Figure 4:
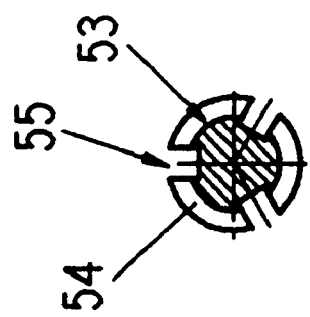
FIG. 4 is a cross-section through a valve element as shown in FIG. 2.
Figure 3:
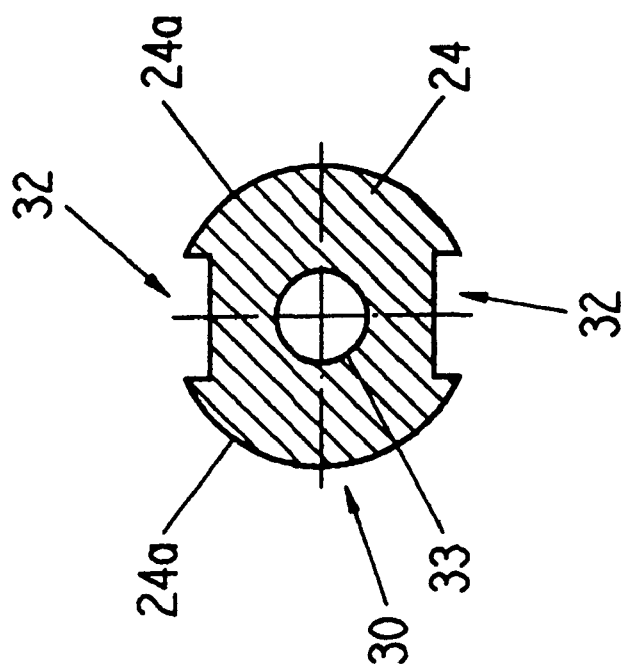
FIG. 3 is a cross-section through an armature as shown in FIG. 2.

A first example embodiment of the reciprocating plunger pump 1 in accordance with the invention is illustrated in FIGS. 2 to 4.

The reciprocating plunger pump 1 comprises a substantially elongated cylindrical two part pump body having a first and second pump body part 15, 15a including an armature centerbore 16, two valve drillings 17, 17½ and two pressure chamber drillings 18, 18½ each incorporated in sequence in the pump body 15, 15a and a through-passage extending through the complete pump body.

The armature centerbore 16 is arranged in the direction of the longitudinal axis between the valve drillings 17, 17½ and the pressure chamber drillings 18, 18½. The drillings 16, 17, 17½, 18, 18½ are arranged concentrically to the longitudinal axis 19 of the pump body 15, 15a, the armature centerbore 16 and the pressure chamber drilling 18, 18½ each comprising a larger inner diameter than the valve drillings 17, 17½ so that the armature centerbore 16 and the valve drillings 17, 17½ and respectively the valve drillings 17, 17½ and pressure chamber drillings 18, 18½ are offset from each other by first and second ring steps 21, 21½ and 22, 22½ respectively.

The impulse pressure direction 27 is defined as a direction parallel to the longitudinal axis 19 oriented from the second pump body 15a part in the direction of the first pump body 15 part.

The drillings 16, 17, 17½, 18, 18½ are arranged roughly mirror-symmetrical about a transverse centerplane 12 of the reciprocating plunger pump 1, whereby the components arranged in the impulse pressure direction 27 in front of the plane (to the right of plane as shown in FIG. 2) form a first delivery pump 13 and the components arranged in the impulse pressure direction 27 behind the plane (to the left of plane as shown in FIG. 2) form a second delivery pump 14.

Like components of the first delivery pump 13 serving e.g. as the pre-delivery pump and those of the second delivery pump serving e.g. as the post-delivery pump are identified by like reference numerals, except that the reference numerals of the post-delivery pump 14 have a comma (½), since the components are essentially the same in shape. To indicate the axial direction in the following description in the drillings 16, 17, 17½, 18, 18½ "inwards" is taken to be in the direction towards plane 12 and "outwards" the direction away from the transverse center plane 12.

Radially the armature centerbore 16 defines an armature space 23 in which a roughly cylindrical armature 24 is arranged reciprocatingly in the direction of the longitudinal axis. The armature space is defined in the direction of the pre-delivery pump 13 by a first ring step 21 and in the direction of the post-delivery pump 14 by a first ring step 21½, the latter being configured as a face or stop surface area 25 of the second body part 15a. The second body part 15a is screwed into an axial open end of the armature centerbore 16 of the first body part 15 by a cylindrical threaded section 26.

The armature 24 is configured as a substantially cylindrical body having a front and rear face surface area 28, 29 in the impulse pressure direction 27 relative to the first delivery pump 13 and a shell surface area 30. From the rear face surface area 28 up to roughly the longitudinal centerline of the armature 24 the radius continually increases so that at this point the armature 24 is conical in shape and has a conical surface area 31 extending from the rear to the front. The armature 24 is inserted with a clearance between its shell surface area 30 and the inner surface area of the armature centerbore 16 so that on reciprocation of the armature 24 in the armature centerbore 16 it comes into contact with the inner surface area of the armature centerbore 16 only when tilted, as a result of which the friction between the armature 24 and the armature centerbore 16 is maintained slight. By providing the conical portion 31 at the armature 24 the contact and thus friction surface area is further reduced which in turn further reduces the possibility of friction between the armature 24 and the inner surface area of the armature centerbore 16 and thus also the heat developed. In the region of its shell surface area 30 the armature 24 is provided with at least one, preferably two or more grooves 32 oriented in the direction of the longitudinal axis.

The armature 24 comprises two segments 24a which are roughly semi-circular in cross-section (FIG. 3) and arranged diametrally opposed between which shallow grooves 32 are disposed. Incorporated centrally in the armature 24 is a drilling 33 extending full-length in the direction of the longitudinal axis.

A delivery plunger barrel 35 passes through the drilling 33 of the armature 24 to form a central passage space 26 and protruding from the armature 24 on both sides.

The delivery plunger barrel 35 is positively connected to the armature 24. The unit comprising the delivery plunger barrel 35 and the armature 24 is also termed delivery plunger element 44 in the following. The delivery plunger element 44 may be configured integrally or in one part.

The armature 24 and the delivery plunger barrel 35 comprise two drillings 33a oriented perpendicular to the longitudinal axis 19, these drillings 33a producing in the armature 24 a connection between the passage space 36 and the grooves 32 or the armature space 23.

Seated on the face ring surface area 29 of the armature 24 arranged at the front in the impulse pressure direction 27 or in the direction of the pre-delivery pump 13 is a first supporting ring 37 of a plastics material through which the delivery plunger barrel 35 passes positively clasped. Supported by the first supporting ring 37 to the front is an armature spring 38 which extends up to a corresponding second supporting ring 39 of a plastics material. This second supporting ring 39 is seated on the first supporting ring 37 in the armature centerbore 16.

Positively seated in each of the valve drillings 17, 17½ is a guide tube 40, 40½, the guide tube 40 of the pre-delivery pump 13 extending rearwards into the armature space 23 in the region within the armature spring 38 and the guide tube 40½ of the post-delivery pump 14 ending in the valve drilling 17½ just ahead of the face ring surface area 25 of the rear body part 15a and does not protrude into the armature space 23. At the axial outer ends of the guide tubes 40, 40½ a ring web 41, 41½ protruding radially outwards in each case is provided, each of which is supported inwardly by the corresponding second ring step 22, 22½. The ring webs 41, 41½ fail to extend radially up to the inner surface area of the pressure chamber drillings 18, 18½ so that between the ring webs 41, 41½ and the pressure chamber drillings 18, 18½ a narrow cylindrical gap 42, 42½ remains. Due to the ring webs 41, 41½ the guide tubes 40, 40½ are locked in place to prevent an axial shift inwards.

The delivery plunger barrel 35 positively connected to the armature 24 extends axially ouwards on both sides up to the two guide tubes 40, 40½ so that the delivery plunger barrel 35 is guided at both its front end 45 and it rear end 46. Due to the elongated delivery plunger barrel 35 being guided at both ends 45, 46 the delivery plunger element 44 is guided with zero tilt so that friction between the armature 24 and the inner surface area of the armature centerbore 16 is avoided to a major extent.

Mounted axially shiftable in the axially outwards located portion of the guide tubes 40, 40½ in each case is a valve element 50, 50½, each of which forms a substantially cylindrical, elongated plug-shaped solid body having an outer and inner surface area 51, 51½, 52, 52½ and a shell surface area 53, 53½. The outer diameter of the valve element 50, 50½ corresponds in each case to the clear width of the passage in the guide tubes 40, 40½. Provided at the shell surface areas 53, 53½ of the valve element 50, 50½ in each case is a ring web 54, 54½ arranged roughly at the end of the outer third of the valve element 50, 50½. The ring webs 41, 41½ of the guide tubes 40, 40½ form for the ring webs 54, 54½ of the valve elements 50, 50½ an abutment so that these cannot be shifted further inwards. The valve elements 50, 50½ are provided on their circumference with three shallow, wide grooves 55, 55½ each oriented in the direction of the longitudinal axis (FIG. 4). Each of the ring webs 54, 54½ is interrupted in the region of the grooves 55, 55½. The number, arrangement or shape of the grooves 55, 55½ may be implemented in other ways and means.

At their edge portion the inner face surface areas 52, 52½ of the valve elements 50, 50½ are configured conical and act together with the face surface areas of the ends 45, 46 of the delivery plunger barrel 35 as a valve seat. The ends 45, 46 of the delivery plunger barrel 35 are shaped to comply with the inner face surface areas 52, 52½ of the valve elements 50, 50½ as a valve seat by the inner edge of the delivery plunger barrel 35 in each case being chamfered and the wall of the delivery plunger barrel 35 being slightly machined off on the inside. Accordingly, the delivery plunger barrel 35 forms by its ends 45, 46 in each case a valve seat 57, 57½ for the valve elements 50, 50½. When the valve elements 50, 50½ adjoin the valve seats 57, 571½ by their inner face surface areas 52, 52½ in each case, then the passage through the tube in each case and the grooves 55, 55½ incorporated in the region of the shell surface areas of the valve elements 50, 50½ is closed off.

Each of the portions of the valve elements 50, 50½ protruding from the guide tubes 40, 40½ forwards into the pressure chamber drillings 18, 18½ is surrounded by a pressure chamber element 60, 60½, each of which consists of a cylinder wall 61, 61½ and an outer face end wall 62, 62½, a hole or drilling 63, 63½ being incorporated centrally in each of the face end walls 62, 62½. The pressure chamber elements 60, 60½ are inserted by their cylindrical walls 61, 61½ positively in the pressure chamber drillings 18, 18½, they adjoining the outwardly protruding ring webs 41, 41½ of the guide tubes 40, 40½ by their face surface areas 64, 64½ located at the free ends of the cylinder walls 61, 61½. The pressure chamber elements 60, 60½ comprise at their face surface areas 64, 64½ a vertically oriented groove 65, 65½.

The pressure chamber elements 60, 60½ define by their inner spaces in each case a pressure chamber 66, 66½ into which the valve elements 50, 50½ plunge to compress the fuel present in the pressure chambers 66, 66½. In their inner portion extending over roughly half the length of the pressure chamber element 60 or 60½ the pressure chambers 66, 66½ feature a larger clear width than in the outer portion. The larger clear width in the inner portion is dimensioned so that the valve elements 50, 50½ are able to plunge into the pressure chambers 66, 66½ by their ring webs 54, 54½ with a slight clearance, whereas the clear width of the front portion is dimensioned so that sufficient space exists only for the portions of the valve element 50 extending forwards from the ring webs 54, 54½ and for a coil spring 67, 67½ surrounding each of these portions. As a result of this arrangement the pressure chambers 66, 66½ are configured only slightly larger than the space required by the impulse movement of the valve elements 50, 50½ executed during injection.

The coil springs 67, 67½ are seated by their ends internally on the face end walls 62, 62½ of the pressure chamber elements 60, 60½ and adjoin the valve elements 50, 50½ and, more particularly, the ring webs 54, 54½ thereof by their other ends so that the coil springs 67, 67½ force the valve elements 50, 50½ and the pressure chamber elements 60, 60½ apart.

Figure 1A:
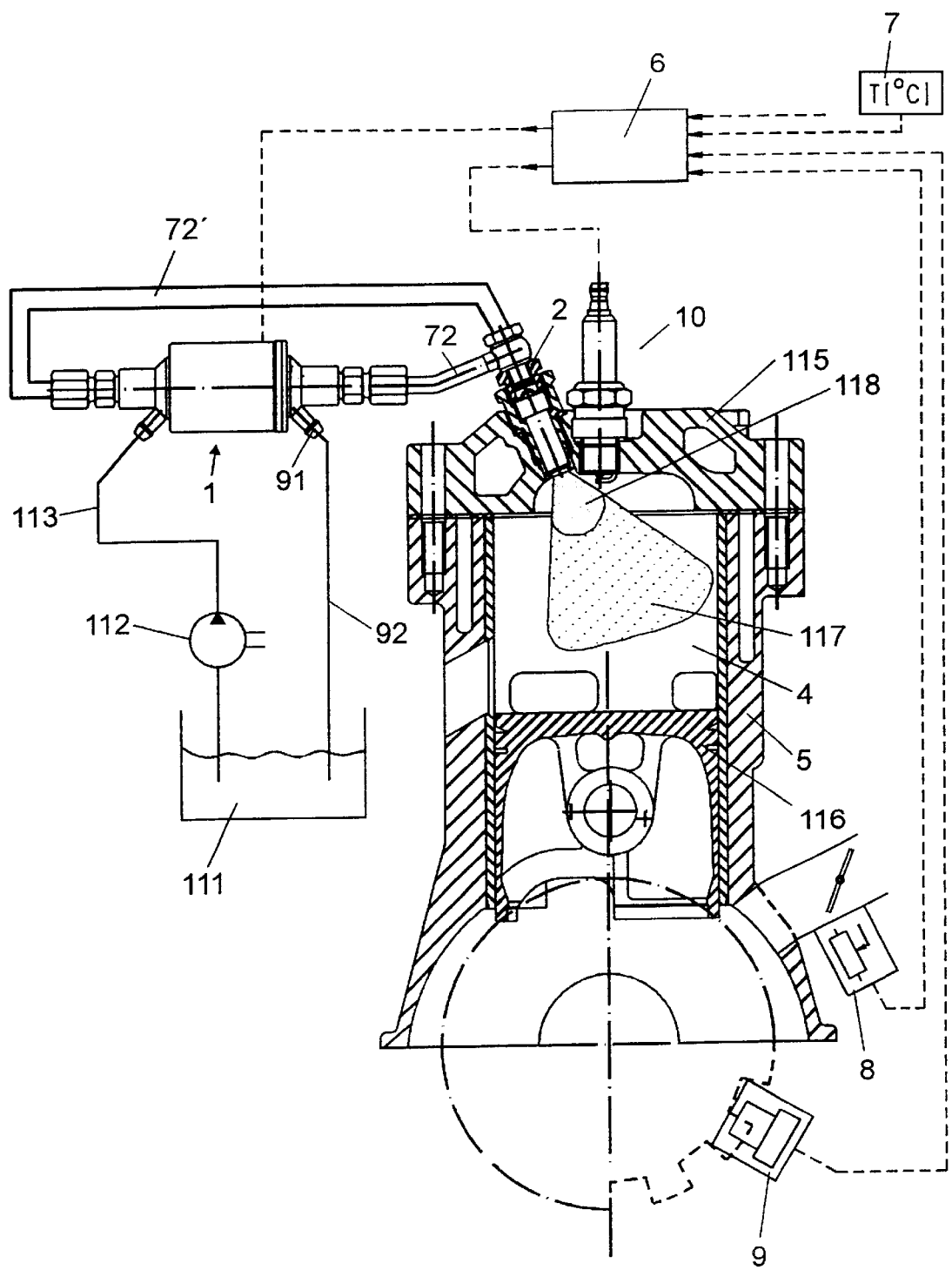
FIGS. 1a and 1b is a schematic illustration of the arrangement of a fuel injection device for a single-cylinder two-stroke engine.
Figure 1B:
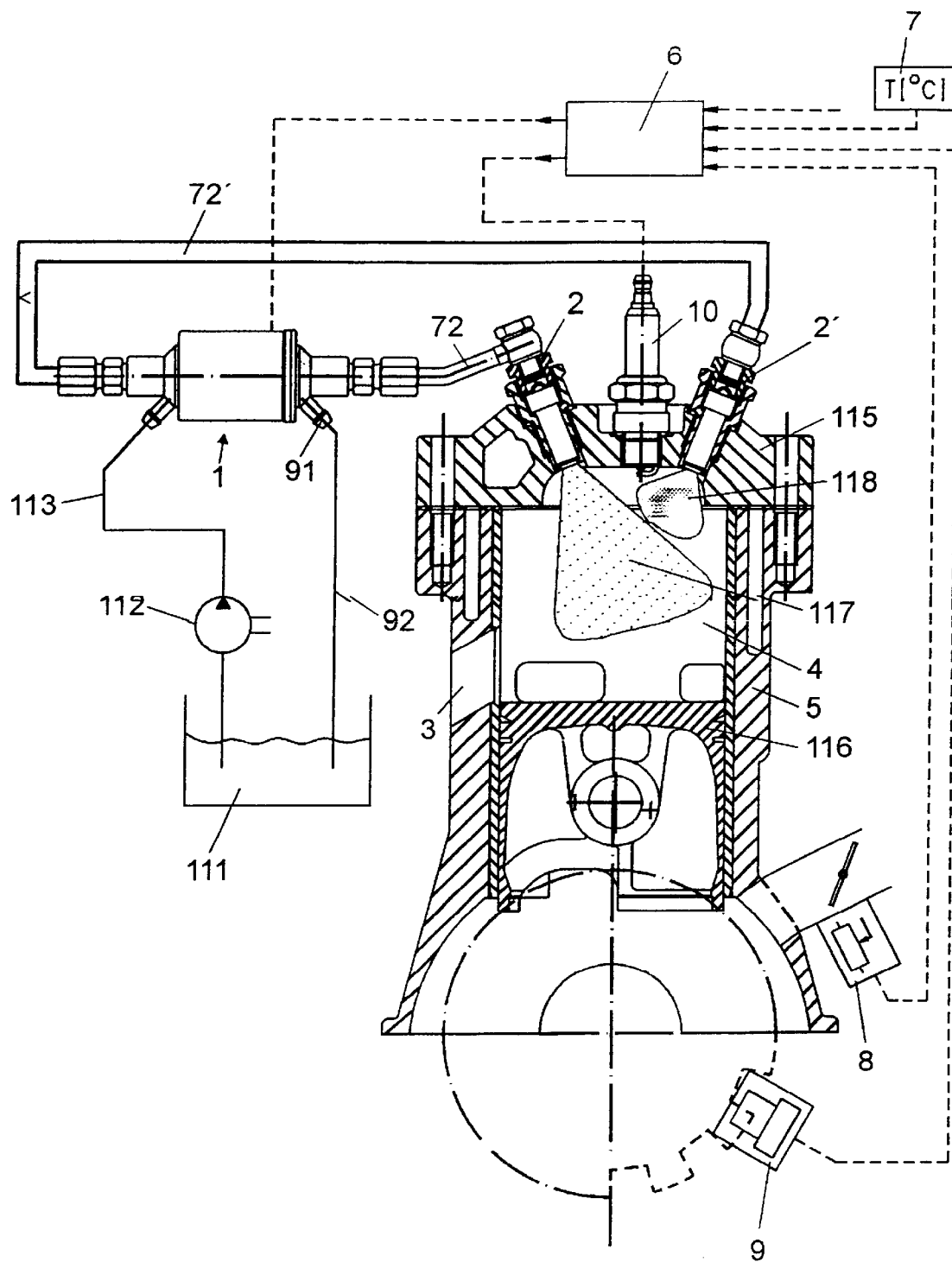

The pressure chamber elements 60, 60½ are axially positioned outwardly or in the direction of injection forwards by a connecting piece 70, 70½ in each case, these connecting pieces 70, 70½ being screwed into the ends of the pressure chamber drillings 18, 18½ open to the outside. The connecting pieces 70, 70½ define the location of the pressure chamber elements 60, 60½ axially outwards so that due to the coil springs 67, 67½ and the pressure chamber elements 60, 60½ the valve elements 50, 50½ are preloaded inwards. On the outside, each of the connecting pieces is configured with a port 71, 71½ for connecting a fuel delivery conduit 72, 72½ (FIGS. 1a, 1b). The connecting pieces 70, 70½ comprise a full-length drilling 73, 73½ in the direction of the longitudinal axis in each of which a standing pressure valve 74, 74½ is accommodated. The standing pressure valves 74, 74½ are arranged preferably adjoining the pressure chamber element 60, 60½ so that the pressure chambers 66, 66½ do not extend further outwards and are configured small in volume.

The fuel delivery conduits 72, 72½ may be connected either to a common injection valve 2 (FIG. 1a) or each to a separate injection valve 2, 2½ (FIG. 1b). The injection valve 2½ for post-delivery is preferably configured so that it atomizes the fuel finer than the injection valve 2 for the pre-delivery, it thus injecting a cloud of very finely dispersed fuel droplets, preferably in the vicinity of the spark plug.

The pressure chamber elements 60, 60½ are each provided on their outer surface areas with an annular groove 68, 68½ in each of which a plastics sealing ring 69, 69½ is located to seal off the pressure chamber elements 60, 60½ from the inner surface areas of the pressure chamber drillings 18, 18½.

For fuel supply a flow space is provided in each of the pump body parts 15, 15a in the region of the pressure chamber drillings 18, 18½ so that the latter port into the grooves 65, 65½ of the pressure chamber elements 60, 60½. On the outside in the pump body parts 15, 15a each fuel supply port 76, 76½ is surrounded by a socket 77, 77½ for a fuel supply valve 78, 78½ which is screwed into the socket 77, 77½. The fuel supply valves 78, 78½ are configured as one-way valves having a valve body 79, 79½. Each of the valve bodies 79, 79½ comprises two axially coincident drilled passages 80, 81 or 80½, 81½, the drilled passages 80, 80½ on the pump body side having a larger inner diameter than the drilled passages 81, 81½ so that between the two drilled passages a ring step is configured each of which forms a valve seat 82, 82½ for balls 83, 83½. Each of the balls 83, 83½ is preloaded against the valve seats 82, 82½ by a spring 84, 84½ supported by the wall of the body parts 15, 15a in the region of the fuel supply ports 76, 76½ so that fuel supplied pressurized from without is able to lift the balls 83, 83½ from the valve seats 82, 82½ allowing fuel to gain access through the drilled passages 80, 80½, the fuel supply ports 76, 76½ and the grooves 65, 65½ into the pressure chamber drillings 18, 18½ and pressure chambers 66, 66½ respectively.

Extending from the pressure chambers 66, 66½ to the armature space 23 is a passage passing through the grooves 55, 55½ of the valve elements 50, 50½, between the valve seats 57, 57½ of the delivery plunger barrel 35 and the inner face surface areas 52, 52½ of the valve elements 50, 50½ when the latter are arranged spaced apart, through the passage space 36 of the delivery plunger barrel 35 and the drillings 33a in the plunger element 44.

Incorporated in the peripheral portion of the first ring step 21 arranged of the side of the pre-delivery pump 13 is a drilling 90 leading outwards as the fuel discharge port. The drilling 90 is extended in length outwards by a connecting port 91 for connecting a fuel return conduit 92 (FIG. 1).

The second pump body 15a comprises adjoining the cylindrical threaded section 26 a circumferential ring step 93 protruding radius outwards. The ring step 93 serves, among other things, to axially locate a solenoid barrel 95 outwardly clasping the first pump body part 15. The solenoid barrel 95 consists of a first, wide cylinder wall 96 and a second narrow cylinder wall 97 having a smaller inner diameter than that of the first cylinder wall 96 which are integrally connected to each other via a radially extending ring web 98. The solenoid barrel 95 is mounted with its first cylinder wall 96 pointing forwards on the first body part 15 until the first cylinder wall 96 comes up against a wall 100 protruding outwards from the first pump body part 15, thus defining an annular chamber 101 having a roughly rectangular cross-section for receiving a solenoid coil 102.

The solenoid barrel 95 is thus clamped in place axially located between the wall 100 and the ring step 93 of the second body part 15½. The second cylinder wall 97 of the solenoid barrel 95 is chamfered at the inner edge of its face surface area facing the post-delivery pump 14, a sealing ring 103 such as e.g. an O-ring being clamped in place between the chamfer formed in the face surface area, the first body part 15 and the ring step 93.

The solenoid coil 102 is cross-sectionally more or less rectangular and potted by means of an epoxy resin in a supporting cylinder 104 U-shaped in cross-section so that the solenoid coil 102 and the supporting cylinder 104 form an integral solenoid module. The supporting cylinder 104 has a cylinder wall 105 and two sidewalls 106, 107 protruding radially outwards from the cylinder wall 105 and defining the space for the solenoid coil 102, the cylinder wall 105 extending laterally beyond the rear sidewall 106 so that the face surface area 108 thereof adjoins the face surface areas 109 of the sidewalls 106, 107 and the inner surface areas of the cylinder wall 106 and the front sidewall 107 positively in the annular chamber 101.

In the region of the first pump body part 15 arranged between the solenoid coil 102 and the armature space 23 a material is incorporated having a low magnetic conductivity, e.g. copper, aluminum, stainless steel, to prevent a magnetic short-circuit between the solenoid coil 102 and the armature 24.

Figure 5:
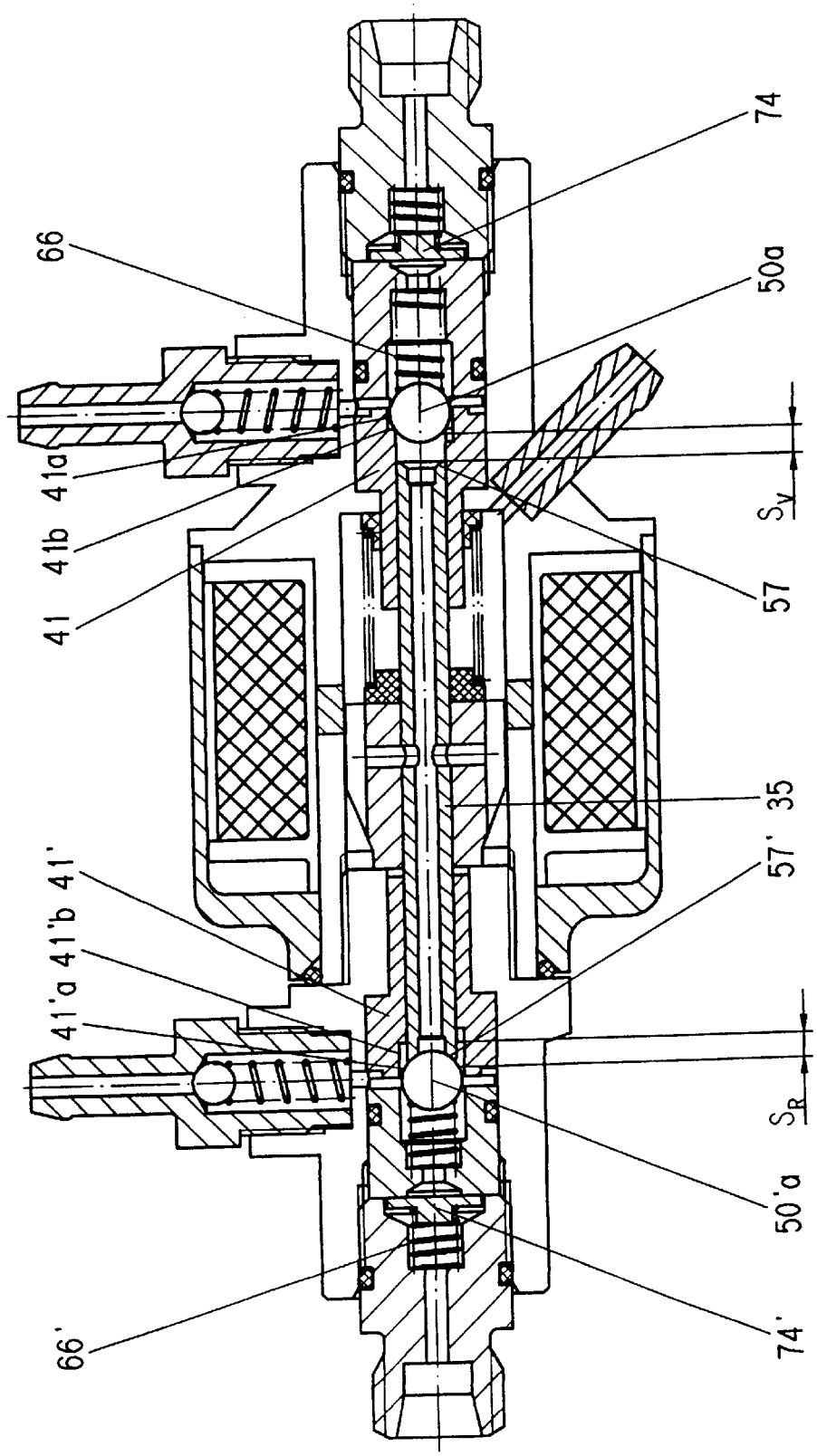
FIG. 5 is a schematic longitudinal section through a second example embodiment of an injection pump in accordance with the invention.

A second example embodiment of the injection pump in accordance with the invention is illustrated in FIG. 5.

The configuration of the reciprocating plunger pump 1 in accordance with the second example embodiment is substantially the same as that of the reciprocating plunger pump 1 already described so that parts having the same shape and same function are characterized by like reference numerals.

The elongation of the reciprocating plunger pump in accordance with the second example embodiment is less than that of the reciprocating plunger pump in accordance with the first example embodiment, this shortening in length being achieved substantially by using balls 50a, 50a½ as the valve elements. The ring webs 41, 41½ of the guide tubes 40, 40½ form for the balls 50a, 50a½ an abutment to prevent them from being shifted further inwards, each of the ring webs 41, 41½ being configured with an annular ball seat 41a, 41a½ adapted to the ball-shape so that the balls 50a, 50a½ are able to positively contact the ring web 41, 41½ portionwise.

The balls 50a, 50a½ comprise a smooth surface, this being the reason why grooves 41b, 41b½ are incorporated in the ball seats 41a, 41a½ to connect the pressure chambers 66, 66½ to the gap between the valve seats 57, 57½ of the delivery plunger barrel 35 and the surfaces of the balls 50a, 50a½ when the latter are arranged spaced away from the valve seats 57, 57½. By providing the grooves 41b, 41b½ scavenging is made possible through the delivery plunger barrel 35.

The functioning of the fuel injection device in accordance with the invention will now explained with reference to the first example embodiment of the invention.

When the flow of current through the solenoid coil 102 is interrupted the armature 24 is urged by the armature spring 38 to the rear against the face or stop surface area 25 of the second body part 15a which the armature 24 contacts by its rear face surface area 49. This is the starting position of the armature 24 in which the delivery plunger barrel 35 with its valve seat 57 facing in the direction of the pre-delivery pump 13 is arranged spaced away from the rear face surface area 52 of the valve element 50 by a spacing sV. In this starting position the delivery plunger barrel 35 urges by the valve seat 57½ the valve element 50½ of the post-delivery pump 14 against the spring force of the coil spring 67½ so that the ring web 54½ of the valve element 50½ is spaced away from the ring web 41½ of the guide tube 40½ by a spacing sR.

In this starting position the fuel subjected to a pre-pressure is supplied from the fuel tank 111 by means of a fuel-lift pump 112 and a fuel supply conduit 113 through the fuel supply valve 78 into the pressure chamber 66 of the pre-delivery pump 13. From the pressure chamber 66 the fuel flows through the grooves 55 incorporated in the shell portion of the valve element 50 through the guide tube 40 into the gap between the valve seat 57 of the delivery plunger barrel 35 and the inner face surface area 52 of the valve element 50 and into the passage space 36 of the delivery plunger 35. From the passage space 36 of the delivery plunger 35 the pressurized fuel flows through the drilled passages 33a through the delivery plunger barrel 35 and the armature 24 to flood the armature space 23. The portions of the armature space 23 upstream and downstream of the armature 24 are communicatingly connected to each other by the grooves 32 incorporated in the armature 24 so that the complete armature space 23 is filled with fuel. Through the drilling 90 and the connecting port 91 the fuel is directed back into the fuel tank 111.

Accordingly, in the starting position of the delivery plunger element 44 a flow path exists for the fuel extending from the fuel supply valve 78 via the pressure chamber 66 of the pre-delivery pump 13, the passage space 36 of the delivery plunger 35, the drilled passages 33a in the plunger element 44, the armature space 23, the drilling 90 and the connecting port 91 so that fuel is continually supplied and scavenged through the flow path, whereby the pressure chamber 66 of the pre-delivery pump 13 is always supplied and flooded with fresh, cool and thus bubbleless fuel directly from the fuel tank 111.

The pre-pressure generated by the fuel-lift pump 112 is, on the one hand, greater than the drop in pressure resulting in the flow path so that continuous scavenging of the reciprocating plunger pump 1 is assured and, on the other, it is smaller than the passage pressure of the standing pressure valve 74 so that in the starting position of the delivery plunger element 44 no fuel is delivered from the reciprocating plunger pump 1 to the injector 2.

When the solenoid coil 102 is energized by application of an electrical current the resulting magnetic field causes the armature 24 to move in the direction of the pre-delivery pump 13 and executes a movement which actuates the valve element 50 of the pre-delivery pump 13 for a pre-injection. The movement of the pump element (=armature 24 and delivery plunger barrel 35) counteracts only the spring force of the armature spring 38 during a prestroke over the length sV (corresponding to the spacing between the valve seat 57 of the delivery plunger barrel 35 and the inner face surface area 52 of the valve element 50 in the starting position). The spring force of the armature spring 38 is configured so soft that the armature 24 is moved practically with zero resistance, the spring force being nevertheless sufficient to return the armature 24 back to its starting position. The armature 24 "floats" in the pressure space 23 filled with fuel, the fuel being able to flow back and forth at will between the portions upstream and downstream of the armature 24 in the armature space 23 so that no pressure is built up counteracting the armature 24. The delivery plunger element 44 consisting of the armature 24 and the delivery plunger barrel 35 is thus continually accelerated and stores kinetic energy.

During the impulse movement of the plunger element 44 in the direction of the pre-delivery pump 13 the valve element 50 of the post-delivery pump 14 is entrained in the movement of the plunger element 44 due to the effect of the coil spring 67½ until its ring web 54½ comes up against with the ring web 41½ of the guide tube 40½. In this arrangement the volume of the pressure chamber 66½ of the post-delivery pump 14 is enlarged so that "fresh" or bubbleless fuel is drawn in via the fuel supply valve 78½. Once the plunger element 44 has executed a prestroke over the distance sR (corresponding to the spacing between the ring web 59½ of the valve element 50½ from the ring web 41½ of the guide tube 40½ in the starting position of the plunger element 44) the valve seat 57½ releases from the inner face surface area 52½ of the valve element 50½ so that between the face surface area 52½ and the valve seat 57½ a spacing is configured which forms a passage from the pressure chamber 66½ through the grooves 55½ into the passage space 36 of the delivery plunger barrel 35. Accordingly, a flow path is formed throughout from the fuel supply valvw 78½ to the armature space 23 or drilling 90 during the impulse movement of the plunger element 44.

At the end of the prestroke sV the delivery plunger element 44 comes up against the inner face surface area 52 of the valve element 50 of the pre-delivery pump 13 by its valve seat 57, resulting in the valve element 50 being abruptly forced outwards. Since the delivery plunger barrel 35 is then in contact by its valve seat 57 with the inner face surface area 52 of the valve element 50 the flow path from the pressure chamber 66 of the pre-delivery pump 13 to the passage space 36 of the delivery plunger barrel 35 is open-circuited so that fuel can no longer escape from the pressure chamber 66 to the rear. The fuel is thus displaced from the pressure chamber 66 by the impulse and the further feed movement of valve element 50, it thereby being pressurized. In this situation the fuel supply valve 78 is closed due to a pressure having built up in the pressure chamber and in the drilling 80 of the fuel supply valve 78 which is higher than the pressure with which the fuel is supplied by the fuel-lift pump. As of a predetermined pressure the standing pressure valve 74 then opens so that a predetermined pressure is exerted on the fuel located in the delivery conduit between the injector 2 and the reciprocating plunger pump 1 which for example is 60 bar as dictated by the passage pressure of the injector 2. Contact impact of the delivery plunger element 44 thus results in the energy stored in the movement of the delivery plunger element 44 being instantly transmitted to the fuel located in the pressure chamber 66.

The time during which the solenoid coil 102 is energized and the plunger element 44 is moved determines the travel of the valve element 50 in displacing the fuel into the pressure chamber 66, as a result of which the fuel delivered by the pre-delivery pump 13 is proportional to the travel of the valve element 50 or proportional to the time interval during which the solenoid coil 102 is energized. The maximum delivery travel may be a multiple of the spacing sV between the valve seat 57 and the inner face surface area 52 of the valve element 50 in the starting position of the plunger element 44.

Fuel delivery of the pre-delivery pump 13 is terminated by the the solenoid coil 102 being taken out of circuit, as a result of which the plunger element 44 is returned to its starting position by the action of the armature spring 38 and a recoil movement is implemented to actuate the valve element 50½ of the post-delivery pump 14 for a post-injection. When the armature 24 is at a spacing sR from the stop surface area 25 the plunger element 44 comes up against the valve element 50½ by its valve seat 57½ pointing in the direction of the post-delivery pump 14, urging the valve element 50½ into the pressure chamber 66½, fuel then being displaced from the pressure chamber 66½. The armature 24 comes up against the stop surface area 25, as a result of which the stroke sR of the post-delivery pump 14 is abruptly discontinued and the plunger element 44 is again in its starting position.

The recoil movement of the plunger element 44 may be delayed in time by the the solenoid coil not being taken out of circuit at the end of the fuel delivery by the pre-delivery pump 13 and instead the current value being reduced for a predetermined delay time interval to a level which causes the plunger element 44 to be no longer moved in the impulse direction 27 whilst retarding its recoil movement so that the plunger element 44 comes up against the valve element 50½ delayed in time, as a result of which the time interval between fuel delivery by the pre-delivery pump 13 and fuel delivery by the post-delivery pump 14 can be controlled.

The distance sR travelled by the valve element 50½ during injection activity of the post-delivery pump 14 is the same for every post-delivery stroke so that it is always the same amount of fuel that is injected by the post-delivery pump 14 for each injection activity. This constant injection amount is preferably selected so that it corresponds to the fuel requirement of the connected engine in idling.

The stroke sV of the pre-delivery pump 13 is preferably greater or equal to the stroke sR of the post-delivery pump 14 (sV<sR) so that the complete delivery stroke of the post-delivery pump 14 can be implemented without fuel delivery occuring at the pre-delivery pump 13.

The double-acting reciprocating plunger pump 1 in accordance with the invention may be put to use to particular advantage for charge stratification in spark ignition engines in which fuel at high pressure is ejaculated into the combustion chamber 4 by the injection pump 1 (FIG. 1a). The combustion chamber 4 is defined in known ways and means by the cylinder 5, a cylinder head 115 and a piston 116. Incorporated in the cylinder head 115 is a spark plug 10 and an injector 2 for direct injection into the combustion chamber 4. The injector 2 is connected via the fuel delivery conduit 72, 72½ to the injection pump 1.

Fuel pre-pressurized, where necessary, is supplied to the injection pump 1 from a fuel tank 111 via a fuel-lift pump 112 by a fuel supply conduit 113. The injection pump 1 and the spark plug 10 are controlled by the control means 6 which is connected to several sensors such as e.g. the temperature sensor 7, the butterfly valve sensor 8 and crank angle sensor 9 for sensing pertinent engine performance parameters.

By means of the method in accordance with the invention an initial amount of fuel which is variable, i.e. governed as a function of the load, the main amount of fuel, is injected into the combustion chamber 4. The main amount of fuel is metered so that a lean, non-ignitable mix ratio of l>1.5 materializes on mixing, e.g. swirling during a piston stroke with an induced amount of air. This is followed by a second amount of fuel, the ignition amount of fuel being injected into the combustion chamber 4 in the region of the spark plug 10 having a richer mix ratio, for example l=0.85 to 1.3 which is ignited by the spark plug 10. The ignition amount of fuel is preferably maintained more or less constant. The resulting flame front propagates in the fuel/air mixture relatively consistently, resulting in ideal emission values being achieved due to the preset or preselected mix ratios.

The success of the method in accordance with the invention is based on the fact that in the case of the high injection pressures employed, exceeding 40 bar for example, large amounts of fuel form a cloud. e.g. in the form of a lobe which is not already decelerated in the vicinity of the injection valve 2 by the gas contained in the combustion chamber 4, it instead penetrating into the combustion chamber 4 with a predeterminable propagation rate where it disperses. Smaller atomized amounts of fuel are decelerated directly on entering the combustion chamber 4 in the vicinity of of the injection valve 2 due to the high pressure. When this cloud of fuel is located so that it extends into the sparking region of the spark plug 10 it can be ignited. Accordingly, it is expedient to arrange the injection valve 2 adjoining the spark plug 10 in a vee formation facing each other (FIGS. 1a, 1b).

Accordingly, the method in accordance with the invention achieves by surprisingly simple ways and means a charge stratification which can be optimized by separate injection of a lean fuel/air mixture and a rich fuel/air mixture into one and the same combustion chamber 4 without it being necessary to configure the combustion chamber 4 with an ancillary chamber for injection. Direct injection results in a substantial reduction in fuel consumption as compared to conventional charge stratification engines having ancillary chambers.

The atomization and decelerating effect as a function of the amount of fuel based on sudden changes in the flow conditions as a function of the amount of fuel offer the further advantage that smallish main amounts of fuel remain centered nearer to the spark plug than largish main amounts of fuel, thus making it possible to specifically influence the difference between the richer fuel cloud 118 of the injected ignition amount of fuel and the lean fuel lobe 117 of the main amount of fuel. As a result of this, the method in accordance with the invention is independent of any undesirable fluctuations as a function of speed and load because pre- and post-injection of the main amount of fuel and ignition amount of fuel respectively is achievable optimized for both smallish and largish main amounts of fuel.

Between the earlier point in time of the pre-injection I and the later point in time of the post-injection II a relatively large period in time III is available (FIG. 6) so that homogenous distribution of a large main amount of fuel is possible in the combustion chamber 4 e.g. due to swirling with the induced air. The resulting fuel/air mixture is in turn distributed in the combustion chamber 4 highly homogenously. Since the ignition amount of fuel, which at high loads is very much less than the main amount of fuel, is injected into the region of the ignition point of the spark plug 10 just before or at the same time as the ignition time point IV 2, a non-homogeneous distribution of fuel and air is effectively produced in the combustion chamber 4. The time interval between pre-injection and post-injection expediently corresponds to a crank angle difference of approximately 40° to 100° and preferably exceeds 60° in the load regime of the spark ignition engine.

Preferably the time interval between the earlier point in time of the pre-injection and the later point in time of the post-injection is controlled proportional to the main amount of fuel so that for a largish main amount of fuel an homogenous distribution thereof is assured and a smallish main amount of fuel is not already diffused to such a degree that it becomes lean to such a degree and removed from the fuel cloud 9b formed by the ignition amount of fuel that it can no longer be combustioned. The main amount of fuel can be controlled variably or as a function of the load, whereby when the engine is idling it can be operated even with just the ignition amount of fuel, i.e. without the main amount of fuel. At high loads the main amount of fuel may amount to e.g. 10 times the ignition amount of fuel.

Figure 6:
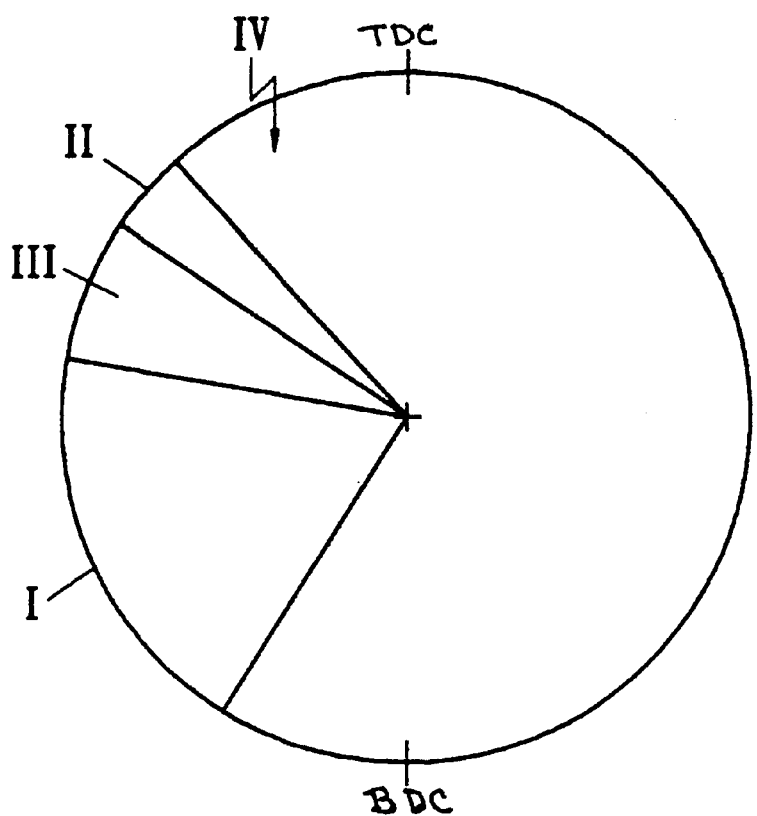
FIG. 6 is a schematic timing diagram of initial and subsequent injection relative to ignition timing.

A timing diagram typical for pre-injection, post-injection and ignition under average load and average speed conditions is shown in FIG. 6 relative to one rotation of the crankshaft. The angle ranges for pre-injection and post-injection are a function of load and speed by ways and means as indicated above, it needing to be taken particularly into account that with increasing speed a certain angular range corresponds to a smaller or diminishing time interval so that the angle ranges for post-injection and pre-injection increase with increasing speed. An angular range ratio typical for average load and average speed is 1:2:4 for the time periods of post-injection; time spacing between pre-injection and post-injection:pre-injection.

The design injection pressure of the method in accordance with the invention e.g. of the pressure impulse is more than or equal to 40 bar and lies preferably in the region of of 60 bar. At an injection pressure of 60 bar a fuel injection velocity of approximately 50 m/s is achieved using conventional injectors. It is these injection velocities together with the high injection pressure that apparently result in the atomization and decleration effects as a function of the amount of fuel which lead to the optimum charge stratification in the dual injection employed in accordance with the invention.

What is claimed is:

1. A fuel injection device operating on a the solid-state energy storage principle, wherein the fuel injection device is configured as a reciprocating plunger pump having a delivery plunger element, said delivery plunger element being movable from a starting position in the direction of a first pressure chamber, said delivery plunger element storing kinetic energy during a near zero-resistance acceleration phase, the kinetic energy being abruptly transmitted by an impulse movement to fuel present in the first pressure chamber so that a pressure impulse is generated for forcing a first quantity of fuel through an injector means into a combustion chamber, the fuel injection device further comprising a second pressure chamber arranged on a side of said delivery plunger element opposite the first pressure chamber such that kinetic energy absorbed on a return movement of said delivery plunger element to its starting position is transmitted by an impulse movement to fuel present in the second pressure chamber so that a second quantity of fuel is forced into the combustion chamber.

2. The fuel injection device as claimed in claim 1 wherein:
the means interrupting the near zero-resistance acceleration phase and producing the pressure impulse in said first pressure chamber is a valve comprising a valve element and a valve seat configured on said delivery plunger element, and adapted to close said first pressure chamber for producing the pressure impulse, said valve seat and said valve element being arranged at an end of said delivery plunger element located at the front in the impulse direction so that said first pressure chamber is configured spatially separated from said delivery plunger element.

3. The fuel injection device as claimed in claim 2 wherein: said means interrupting said near zero-resistance acceleration phase and producing said pressure impulse in said second pressure chamber is a valve comprising a valve element and a valve seat configured on said delivery plunger element and adapted to close said second pressure chamber for producing said pressure impulse, said valve seat and said valve element being arranged at another end of said delivery plunger element located at the front in the impulse direction so that said second pressure chamber is configured spatially separated from said delivery plunger element.

4. The fuel injection device as claimed in claim 1 wherein: said fuel injection device is configured as a solenoid coil-actuated reciprocating plunger pump including a solenoid coil and said delivery plunger element being driven by said solenoid coil, said delivery plunger element comprising a generally cylindrical armature and an elongated delivery plunger barrel extending longitudinally beyond said armature and each being supported and mounted for longitudinal movement.

5. The fuel injection device as claimed in claim 4 wherein: said delivery plunger barrel is connected to said armature, and one of said valve seats is arranged at each end of said delivery plunger barrel.

6. The fuel injection device as claimed in claim 4 wherein: each of said valve elements forms an elongated, substantially cylindrical solid body mounted in a guide tube axially movable, said guide tube being provided on its circumference with grooves oriented longitudinally, said grooves forming a passage from one of said pressure chambers into a passage space within said delivery plunger barrel, said passage space being closed off when one of said valve seats abuts said corresponding valve element, as a result of which said corresponding pressure chamber is closed.

7. The fuel injection device as claimed in claim 5 wherein: each of said valve elements is a ball, and ball seats being provided forming an abutment for said balls so that said balls cannot be moved away from said respective pressure chambers, and said ball seats each including at least one groove forming a passage from one of said pressure chambers into a passage space within a delivery plunger barrel, said passage being closed off when one of said valve seats adjoins said corresponding valve element as a result of which said corresponding pressure chamber is closed.

8. The fuel injection device as claimed in claim 4 wherein: said cylindrical armature comprises in said impulse direction a front and rear face surface area and a shell surface area and a conical surface area extending from said rear face surface area up to approximately the longitudinal centerpoint of said armature from rear to front.

9. The fuel injection device as claimed in claim 8 wherein: said reciprocating plunger pump comprises a pump body having an armature centerbore in which an armature space through said armature centerbore is defined by a first ring step and by a second ring step, said armature being reciprocated in said armature space by a solenoid coil and an armature spring urging said armature in the direction of the longitudinal axis, said armature being configured at its shell portion with a groove oriented in the direction of the longitudinal axis.

10. The fuel injection device as claimed in claim 9 wherein: said armature assumes said starting position due to the spring force of said armature spring when said solenoid coil is de-energized, said valve seat oriented in the direction of said first valve chamber being arranged spaced away from a corresponding face end wall by a space and said valve seat arranged in the direction of said second pressure chamber adjoining said corresponding face surface area of said corresponding valve element so that said valve element is urged somewhat into said pressure chamber.

11. The fuel injection device as claimed in claim 10 wherein: said plunger element comprises a bore connecting said passage space within said delivery plunger barrel to said armature space, and said armature space is connected via a bore leading outwards through a connection port to a fuel return conduit.

12. The fuel injection device as claimed in claim 1 wherein: each of said pressure chambers is defined by a standing pressure valve which opens at a predetermined pressure and allows fuel to flow through the passage in a fuel delivery conduit to an injector.

13. The fuel injection device as claimed in claim 1 wherein: each of said first and said second pressure chambers is only slightly larger than the space required by said impulse movement of said corresponding valve element executed during injection.

14. The fuel injection device as set forth in claim 1 wherein: the kinetic energy is stored on return movement to the starting position during a near zero-resistance acceleration phase and the stored kinetic energy is abruptly transmitted by a recoil movement to the fuel present in said second pressure chamber.

15. A fuel injection device for injecting fuel into a combustion chamber, comprising:
a reciprocating plunger element;
a first pressure chamber having a first pressure valve in a first passage communicating with the combustion chamber, the reciprocating plunger element being driven by the fuel injection device in a first direction to generate a pressure surge in fuel present in the first pressure chamber so that a first quantity of fuel is injected through the first passage and into the combustion chamber; and
a second pressure chamber having a second pressure valve in a second passage communicating with the combustion chamber, the reciprocating plunger element being driven by the fuel injection device in a second direction, opposite the first direction, to generate a pressure surge in fuel present in the second pressure chamber so that a second quantity of fuel is injected through the second passage and into the combustion chamber.

16. The fuel injection device as recited in claim 15, comprising a first and a second fuel injector, wherein pressurized fuel in the first pressure chamber is injected into the combustion chamber via the first fuel injector and pressurized fuel in the second pressure chamber is injected into the combustion chamber via the second fuel injector.

17. The fuel injection device as recited in claim 15, comprising a fuel injector, wherein pressurized fuel in the first and second pressure chambers is injected into the combustion chamber via the fuel injector.

18. The fuel injection device as recited in claim 15, comprising an electric motor, wherein the reciprocating plunger element is driven in the first direction by the electric motor.

19. The fuel injection device as recited in claim 18, wherein the electric motor is a reluctance motor.

20. The fuel injection device as recited in claim 18, comprising a biasing member, wherein the biasing member drives the reciprocating plunger element in the second direction.

21. The fuel injection device as recited in claim 20, wherein the biasing member is a spring.

22. The fuel injection device as recited in claim 15, wherein fuel is drawn into the second pressure chamber as the reciprocating plunger element is driven in the first direction.

23. A method of injecting fuel for combustion into a combustion chamber, comprising the acts of:

driving a reciprocating plunger element in a first direction to generate a pressure surge in fuel present in a first pressure chamber so that a first quantity of feel is injected through a first pressure valve in a first outlet and into the combustion chamber; and driving the reciprocating plunger element in a second direction, opposite the first direction, to generate a pressure surge in fuel present in the second pressure chamber so that a second quantity of fuel is injected through a second pressure valve in a second outlet and into the combustion chamber.

24. The method as recited in claim 23, further comprising the act of enlarging the second pressure chamber's volume to draw in fuel as the reciprocating plunger element is driven in the first direction.

25. The method as recited in claim 23, further comprising the act of injecting fuel from the first pressure chamber into the combustion chamber via a first fuel injector and injecting fuel from the second pressure chamber into the combustion chamber via a second fuel injector.

26. The method as recited in claim 23, further comprising the act of injecting fuel from the first pressure chamber into the combustion chamber via a first fuel injector and injecting fuel from the second pressure chamber into the combustion chamber via the first fuel injector.

27. The method as recited in claim 23, wherein driving the reciprocating plunger element in the first direction comprises providing electrical power to a linear electric motor to drive an armature, the reciprocating plunger element being drivingly coupled to the armature.

28. The method as recited in claim 27, wherein driving the reciprocating plunger element in the second direction comprises compressing a spring as the reciprocating plunger element is driven in the first direction, wherein the spring drives the reciprocating plunger element in the second direction when the electric motor discontinues driving the armature.

* * * * *